T. SHORT.
Corn Planter.
No. 24,059.
Patented May 17, 1859.
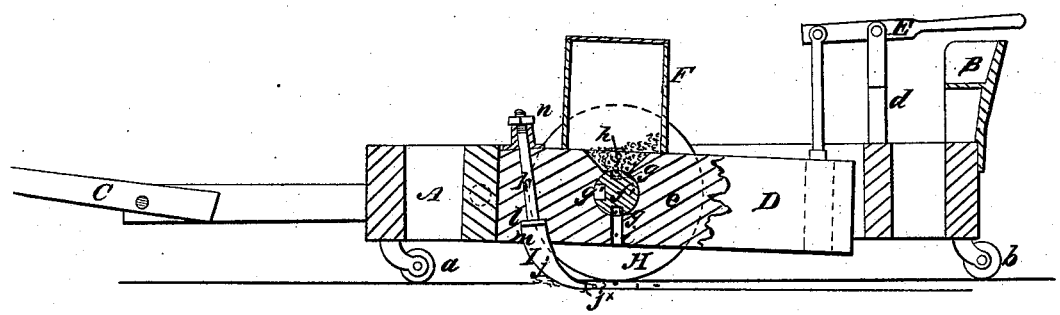
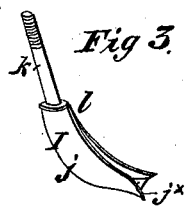
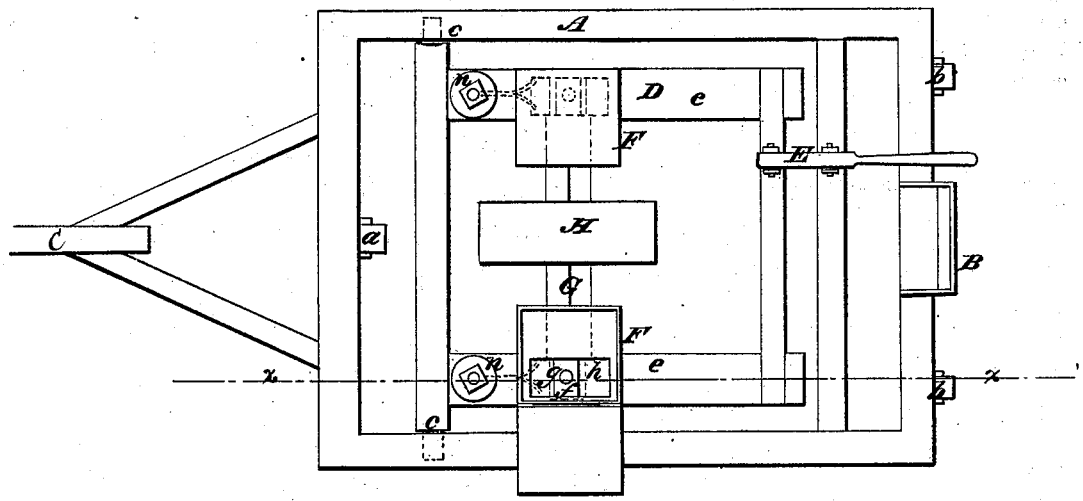
WITNESSES:
Tho. R. Forbes
John C. Short
INVENTOR:
Thomas Short

UNITED STATES PATENT OFFICE.

THOMAS SHORT, OF DANVILLE, ILLINOIS.

IMPROVEMENT IN SEEDING-MACHINES.

Specification forming part of Letters Patent No. 24,059, dated May 17, 1859.

*To all whom it may concern:*

Be it known that I, THOMAS SHORT, of Danville, in the county of Vermilion and State of Illinois, have invented a new and Improved Seeding-Machine; and I do hereby declare that the following is a full, clear, and exact description of the same, reference being had to the annexed drawings, making a part of this specification, in which—

Figure 1 is a longitudinal vertical section of my invention, taken in the line $x\ x$, Fig. 2. Fig. 2 is a plan or top view of the same. Fig. 3 is a detached perspective view of one of the shares of same.

Similar letters of reference indicate corresponding parts in the several figures.

To enable those skilled in the art to fully understand and construct my invention, I will proceed to describe it.

A represents a rectangular frame, which is mounted on three wheels, $a\ b\ b$, the wheel $a$ being a caster-wheel and attached to the center of the front of the machine, the wheels $b\ b$ being attached to the back part of the frame, as shown clearly in Fig. 2. On the back part of the frame A the driver's seat B is placed.

C is the draft-pole, attached to the front of the frame A in the usual way. Within the frame A a swinging frame, D, is placed, the front end of said frame being secured in frame A by trunnions $c\ c$, which fit in the inner side pieces of frame A and allow frame D to rise and fall freely. To the back end of frame D a lever, E, is attached, said lever having its fulcrum in an upright, $d$, on the frame A. At each side $e$ of the frame D a seed-box, F, is placed; and G is a shaft, which is placed transversely in the frame D, the journals $f$ of the shaft passing through the sides $e$ of the frame D and forming seed-distributing drums. The journals $f$ are directly below the seed-boxes F F, and the journals are provided with the usual seed-cells, $g$, which communicate with the boxes F F by taper openings $h\ h$ in the sides $e$. Below the journals $f$ escape-openings $i$ are made. The journals $f$ are allowed to turn freely in the sides $e$ of the frame D, and on the shaft G, at its center, a wheel, H, is placed and permanently secured.

In each side $e$ of frame D a furrow-share, I, is secured. These furrow-shares are of curved form, having a cutting-edge, $j$, and the back parts of the shares are bifurcated, as shown clearly at $j^\times$ in Fig. 3. Each share I has a rod, $k$, attached to it, and a circular collar, $l$, is placed or formed at the junction of the rod and share, said collars forming bearings for the shares, and fitting in circular recesses $m$ in the under parts of the sides $e$. The rods $k$ pass up through the sides $e$ in a somewhat inclined position, and they have nuts $n$ on their upper ends. The shares I are allowed to turn freely, equally so as caster-wheels.

The operation is as follows: As the machine is drawn along the shaft G is rotated by the wheel H, and the seed in the boxes F F is distributed therefrom by the rotation of the journals $f$, with its cells $g$. The shares I form the furrows, a share being placed in front of each opening $i$. The front cutting-edges, $j$, of the shares cut all weeds, trash, sods, and the like, that would otherwise prevent the forming of proper furrows to receive the seed, and the bifurcated back parts, $j^\times$, form furrows of requisite width. The frame D, by its own gravity, will in "stock" ground be sufficient to keep the shares I depressed, so that they will cut weeds, &c.; but in newly-plowed sod ground, and, perhaps, occasionally in stock ground, additional pressure will be required. This is obtained by the driver, who may at any time, from his seat B, press down the frame D with his foot and cause the shares I to sever heavy weeds, tough sods, &c. The wheels $b\ b$ serve as rollers to cover and press the earth on the seed. I propose to have two different-sized seed-cells in the journals $f$—viz., $g$ and $g'$—the latter being for corn and the former for cane-seed. In planting corn the holes $g$ may remain open, as they are too small to receive the grains of corn; but in planting cane-seed the cells $g'$ must be closed by plugs or otherwise. The turning of the shares I facilitates the turning of the machine and insures the forming of perfect furrows in line with the direction of the draft. In moving or drawing the implement from place to place the frame D is raised by the driver, who actuates the lever E, and the wheel H being thereby raised from the ground, the distribution of seed is stopped.

I do not claim the seed-distributing device, nor the bifurcated and cutting shares, for such devices have been previously used; but,

Having thus described my invention, what I do claim as new, and desire to secure by Letters Patent, is—

The swinging frame D, when provided with a seed-distributing device actuated by a wheel, H, and cutting furrow-shares I, and fitted within a mounted frame, A, substantially as and for the purpose set forth.

THOMAS SHORT.

Witnesses:
   THO. R. FORBES,
   JOHN C. SHORT.